July 22, 1958  J. H. GATES ET AL  2,844,413
POWERED TRACK FOR HAND TRUCKS AND THE LIKE
Filed Dec. 17, 1954
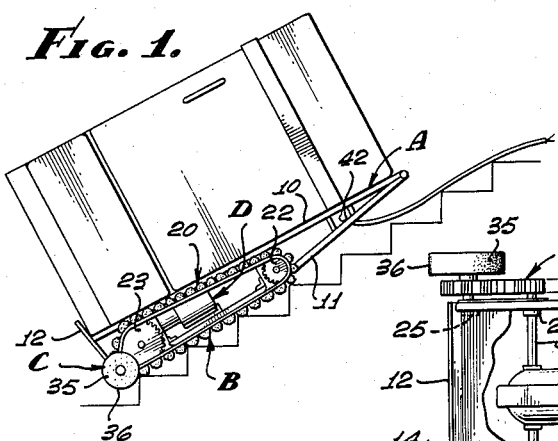
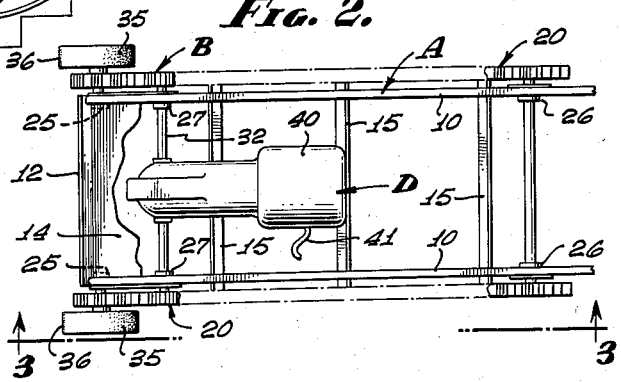
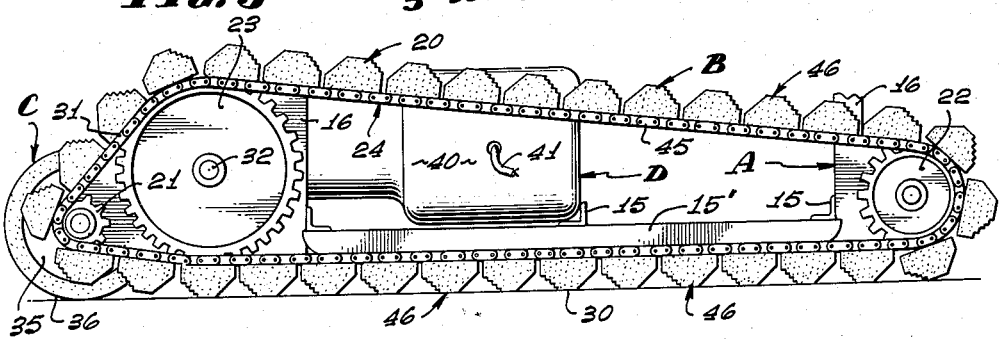
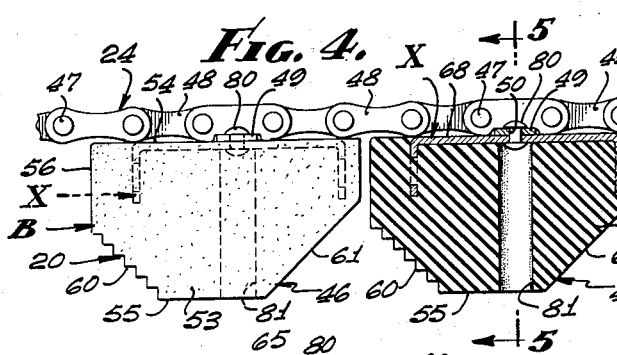
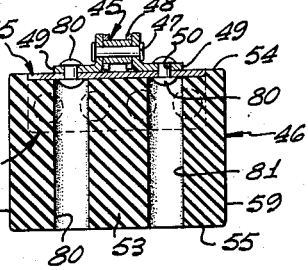
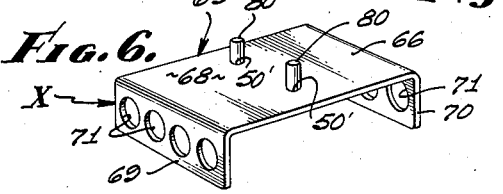
INVENTOR.
JOSEPH HAROLD GATES
DALE GATES
BY
AGENT.

United States Patent Office 2,844,413
Patented July 22, 1958

2,844,413

POWERED TRACK FOR HAND TRUCKS AND THE LIKE

Joseph Harold Gates, Woodland Hills, Calif., and Dale Gates, Milroy, Ind.

Application December 17, 1954, Serial No. 475,879

14 Claims. (Cl. 305—10)

The present invention has to do with a powered attachment for hand trucks and the like, and is particularly concerned with a powered support therefor, it being a general object of the invention to provide a simple, practical, improved support adapted for use in the handling or moving of cargo or loads of various kinds, whether over flat surfaces or up or down stairs or like obstacles.

Ordinary wheel supported cargo handling trucks have long been used and structures for such devices have been proposed or provided to facilitate movement up or down stairs, or the like. Structures of the character under consideration are, for the most part, such as to require considerable skill and care in their operation, as well as considerable manual effort. Furthermore, tractor type treads have been more or less unsatisfactory since it has been difficult, if not impossible, to secure a tread or tire so that it is permanent. Bonding or vulcanizing of a rubber tire, or the like, to a metal part is not enough in itself since the tire will in time break away from the metal part.

It is an object of this invention to provide a powered support for a hand truck which is such that it can be readily operated or rolled over an ordinary surface, such as a floor, in the course of ordinary handling of a load, and which is such that it can, without any variation whatsoever, be operated either up or down stairs or over obstacles as circumstances require.

It is another object of this invention to provide a cargo carrier or hand truck of the character under consideration wherein two powered supporting means are related to each other and are adapted to be selectively employed.

Another object of the invention is to provide a hand truck of the character referred to wherein there is a tractor type support and a wheeled support, which supports are related so that they can be readily engaged or selected for operation as circumstances require.

It is still another object of this invention to provide a powered support for a cargo carrier or hand truck wherein a tractor type tread or support is power driven and which is of reliable and sturdy construction.

The various objects and features of our invention will be fully understood from the following detailed description of a typical preferred form and application of our invention, throughout which description reference is made to the accompanying drawings, in which:

Fig. 1 is a view showing a typical hand truck employing the powered support of the present invention as it is used or operated to negotiate stairs. Fig. 2 is a plan view of the support of the present invention showing it applied to the frame of a hand truck. Fig. 3 is a view taken as indicated by line 3—3 on Fig. 2. Fig. 4 is an enlarged view of a portion of the tractor type support. Fig. 5 is a sectional view through the tractor type support taken as indicated by line 5—5 on Fig. 4, and Fig. 6 is a perspective view of one of the elements of the support that we have provided.

The hand truck may include, generally, a frame A which is an elongate rigid unit and the powered support of the present invention which includes a tractor type support B, and a wheeled support C. The supports B and C are power driven by means of a suitable prime mover or power mechanism D and are related to each other so that either support may be operably engaged with the supporting surface as circumstances require. The tractor type support B is carried by the frame A and is driven by the prime mover D, while the wheel support C is carried by and driven by elements of the support B.

The frame A may vary widely in form and construction and is essentially an elongate rigid unit. As illustrated, the frame A may be a fabricated structure and includes, generally, top rails 10, bottom rails 11, an end plate 12 at the forward end of the frame and suitable braces 16 spacing the rails 10 and 11. A top platform 14 is carried by the top rails 10 and various other parts may be incorporated incidental to those mentioned in order to complete the frame A as desired. In the particular case illustrated, braces 15 extend transversely of the frame between the rails 10 and 11 at the sides thereof, with the result that the general frame construction is established as a fixed rigid unit. Elongate runners 15' are provided at the bottom of the frame A adapted to cooperate with and support the lower portion 30 of the support B hereinafter described.

The tractor type support B is power driven and involves, generally a tread unit 20 at each side of the frame A. The tread units 20 are alike and each includes a front sprocket 21, a rear sprocket 22 and intermediate drive sprocket 23, and a continuous flexible tread 24. The sprockets 21, 22 and 23 are rotatably carried in suitable bearings 25, 26 and 27, respectively, provided on the frame A so that the lower portion 30 of the tread 24 is in a plane substantially parallel with the top of the frame A. In practice, the sprockets 21 and 22 are relatively small in diameter, while the sprocket 23 is rather large. The sprocket 23 is located intermediate the sprockets 21 and 22, preferably near the forward end of the frame A adjacent the sprocket 21. It will be apparent that by providing a relatively large drive sprocket 23 the tread 24 will have substantial engagement with the periphery thereof.

It is a feature of this invention to locate the sprocket 21 on a center so located that the forward leading portion 31 of the tread 24 is angularly related to the lower portion 30 thereof. That is, the leading portion 31 extends forwardly from the drive sprocket 23 in a plane inclined upwardly from the plane of the portion 30.

The drive sprockets 23 of the two units 20 are on a common axis and are driven by a drive shaft 32 which extends transversely of the frame A and which is carried in the bearings 27.

The wheeled support C is power driven and includes, generally, two like wheels 35, one at each side of the frame A. The wheels 35 are carried by and are driven by the sprockets 21 and, in accordance with the invention, are of substantially large diameter. In practice, the wheels 35 are of such diameter that the peripheral tire portions 36 thereof are substantially tangent to the plane of the portion 30 of the treads 24 above described. Thus, when the frame A is raised to lift the tractor type support B the frame will become supported solely by the wheeled support C.

The prime mover D may be an electric motor and gear unit 40 powered through a cable 41 under control of a reversing switch 42 or the like.

The present invention is characterized by the continuous flexible treads 24, above referred to, each of which involves a chain 45 engageable over the sprockets 21, 22 and 23, a series of tire units 46 carried by the chain 45 and means X coupling the tire units 46 to the chain 45. The sprockets 21, 22 and 23 are provided with annular series of circumferentially spaced teeth, in which case the chain is elongate and may be a roller chain or the like, having a continuous series of roller pins 47 joined by links 48. At suitable intervals, preferably equidistant intervals, the links of the chain 45 are provided with laterally projecting ears 49 located at the outer face of the chain 45. As shown, the ears 49 occur at each side of the chain and have fastener openings 50 so that there is a fastener opening 50 at each side of the chain 45 to receive the coupling means X above referred to.

The tire units 46 are provided at intervals along the chain 45 and are secured thereto by the coupling means X hereinafter described, and each involves a block 53 of material, such as rubber or the like. It will be apparent that the hardness of the material forming the block 53 may be varied as circumstances require, depending upon the cushioning effect desired. The block 53 is essentially a rectangular solid and has a bottom face 54, a top face 55, a front face 56, a rear face 57 and end faces 58 and 59, all of which may be simple flat faces. As shown, the block 53 is chamfered, or beveled, where the faces 55 and 56 converge providing a forwardly inclined face 60, and is chambered, or beveled, where the faces 55 and 57 converge providing a rearwardly inclined face 61. The inclined faces 60 and 61 may be serrated as shown in connection with the face 60 to provide for better gripping or traction if so desired.

The means X for coupling the units 46 to the chain 45 involves a base 65 which is, in practice, molded in or integrally combined with the block 53. The base 65 may be formed of a sheet metal adapted to be bonded to or vulcanized to the block 53 and involves a flat plate section 66 and upstanding flanges. As shown, the section 66 has an outer face 68 flush with the bottom face 54 of the block 53 and has a forward flange 69 and a rear flange 70. The flanges 69 and 70 are spaced a substantial distance inwardly from the front and rear faces 56 and 57, respectively.

In accordance with the present invention the flanges 69 and 70 are provided with apertures 71 for passing bodies of material forming the block 53 so that bodies of material molded or integrally formed with the block 53 pass through the apertures 71. In practice, we provide a plurality of apertures 71 in each flange so that they occur in an elongate series (see Fig. 6 of the drawings).

In order to secure the tire units 46 to the chain 45 a pair of spaced openings 50′ are provided in the base 65, which openings are adapted to align with the spaced openings 50 in the ears 49. Suitable fasteners 80 may be applied to the openings in order to secure the units 45 in position. As shown, the fasteners 80 may be rivets, or the like, in which case access passages 81 are formed in the block 53 to accommodate the driving tool of a rivet gun, or the like.

From the foregoing it will be apparent that we have provided an extremely simple and practical powered support for a hand truck, or like vehicle. With the tractor-like support B and the wheel support C related to each other as above described, it is a simple matter to selectively operate either of the supports without the manipulation of any levers or the like; and when the hand truck is operated on a staircase as shown in Fig. 1 of the drawings, it will be apparent that the series of blocks 53 on the tread units 20 engage the corners of the stairs so that the hand truck is propelled upwardly or downwardly as desired in a positive and reliable manner.

Having described only a typical preferred form and application of our invention, we do not wish to be limited or restricted to the specific details herein set forth, but wish to reserve to ourselves any variations or modifications that may appear to those skilled in the art and fall within the scope of the following claims:

Having described our invention, we claim:

1. A tread type vehicle support including, supporting sprockets, a chain having links and engaged over the sprockets, and tire units carried by the chain and each including, a block with flat bottom, top, side and end faces, and a coupling having a base flush with said bottom face and having flanges projecting from the base and imbedded in the block, said base being fastened to ears projecting from the chain.

2. A tire unit for use on a tread type vehicle support having a chain with links, including, a block with flat bottom, top, side and end faces, and a coupling having a base flush with said bottom face and having flanges projecting from the base and imbedded in the block, said base being fastened to ears projecting from the chain.

3. A tread type vehicle support including, supporting sprockets, a chain having links and engaged over the sprockets, and tire units carried by the chain and each including, a block, and a coupling having flanges imbedded in the block and fastened to ears projecting from the chain.

4. A tread type vehicle support including, supporting sprockets, a chain having links and engaged over the sprockets, and tire units carried by the chain and each including, a block, and a coupling fastened to ears projecting from the chain, there being apertures in the coupling and bodies of material integral with the block and engaged through said apertures.

5. A tread type vehicle support including, supporting sprockets, a chain having links and engaged over the sprockets, and tire units carried by the chain and each including, a block, and a coupling having flanges imbedded in the block and fastened to ears projecting from the chain, there being apertures in the flanges and bodies of material integral with the block and engaged through said apertures.

6. A tread type vehicle support including, supporting sprockets, a chain having links and engaged over the sprockets, and tire units carried by the chain and each including, a block with flat bottom, top, side and end faces, and a coupling having a base flush with said bottom face and fastened to ears projecting from the chain, and having flanges imbedded in the block.

7. A tread type vehicle support including, supporting sprockets, a chain having links and engaged over the sprockets, and tire units carried by the chain and each including, a block with flat bottom, top, side and end faces, and a coupling having a base flush with said bottom face and fastened to ears projecting from the chain, there being apertures in the coupling and bodies of material integral with the block and engaged through said apertures.

8. A tread type vehicle support including, supporting sprockets, a chain having links and engaged over the sprockets, and tire units carried by the chain and each including, a block with flat bottom, top, side and end faces, and a coupling having a base flush with said bottom face and fastened to ears projecting from the chain, and having flanges imbedded in the block, there being apertures in the flanges and bodies of material integral with the block and engaged through said apertures.

9. A tire unit for use on a tread type vehicle support having a chain with links, including, a block, and a coupling having flanges imbedded in the block and fastened to ears projecting from the chain.

10. A tire unit for use on a tread type vehicle support having a chain with links, including, a block, and a coupling fastened to ears projecting from the chain, there being apertures in the coupling and bodies of material integral with the block and engaged through said apertures.

11. A tire unit for use on a tread type vehicle support having a chain with links, including, a block, and a coupling having flanges imbedded in the block and fastened to ears projecting from the chain, there being apertures in the flanges and bodies of material integral with the block and engaged through said apertures.

12. A tire unit for use on a tread type vehicle support having a chain with links, including, a block with flat bottom, top, side and end faces, and a coupling having a base flush with said bottom face and fastened to ears projecting from the chain, and having flanges imbedded in the block.

13. A tire unit for use on a tread type vehicle support having a chain with links, including, a block with flat bottom, top, side and end faces, and a coupling having a base flush with said bottom face and fastened to ears projecting from the chain, there being apertures in the coupling and bodies of material integral with the block and engaged through said apertures.

14. A tire unit for use on a tread type vehicle support having a chain with links, including, a block with flat bottom, top, side and end faces, and a coupling having a base flush with said bottom face and fastened to ears projecting from the chain, and having flanges imbedded in the block, there being apertures in the flanges and bodies of material integral with the block and engaged through said apertures.

References Cited in the file of this patent

UNITED STATES PATENTS

| | | |
|---|---|---|
| 1,315,299 | Gregory | Sept. 9, 1919 |
| 1,773,534 | Kegresse | Aug. 19, 1930 |
| 1,975,725 | Martinage | Oct. 2, 1934 |
| 1,975,726 | Martinage | Oct. 2, 1934 |
| 2,037,983 | Johnson | Apr. 21, 1936 |
| 2,597,532 | Richardson | May 20, 1952 |
| 2,620,041 | Chenette | Dec. 2, 1952 |